March 18, 1958     D. L. SMITH     2,827,609
MAGNETIC BRIDGE GAUGE
Filed April 28, 1953     2 Sheets-Sheet 1
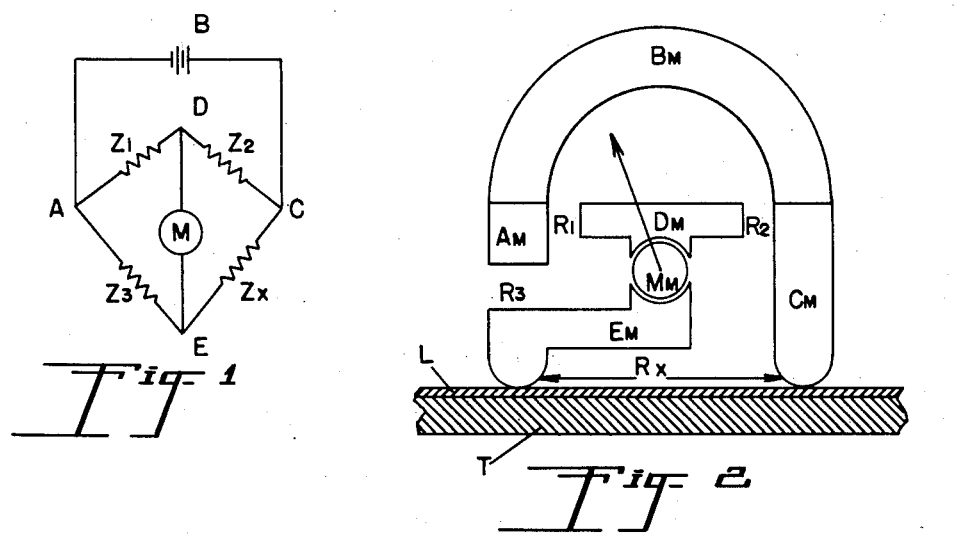
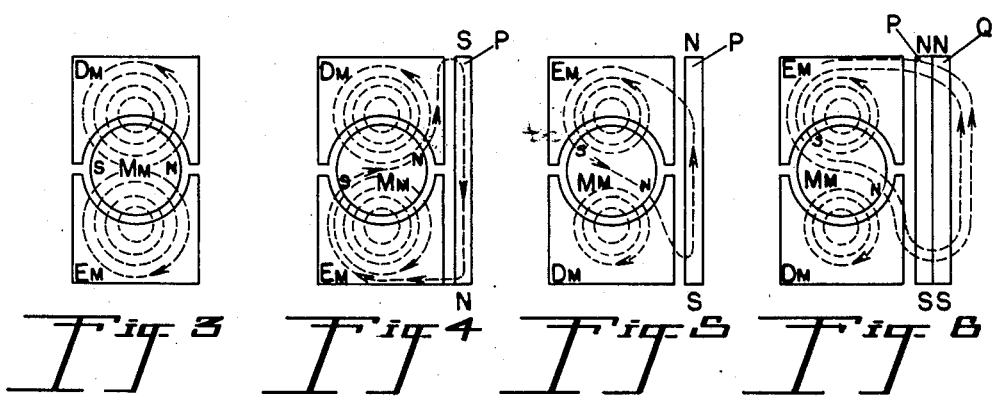
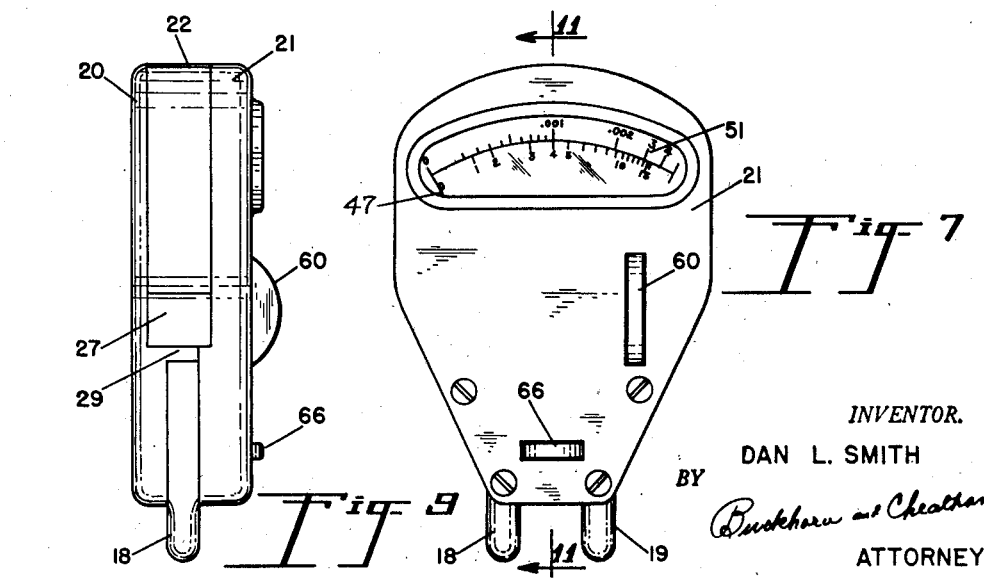
INVENTOR.
DAN L. SMITH
BY
ATTORNEY March 18, 1958 D. L. SMITH 2,827,609
MAGNETIC BRIDGE GAUGE
Filed April 28, 1953 2 Sheets-Sheet 2
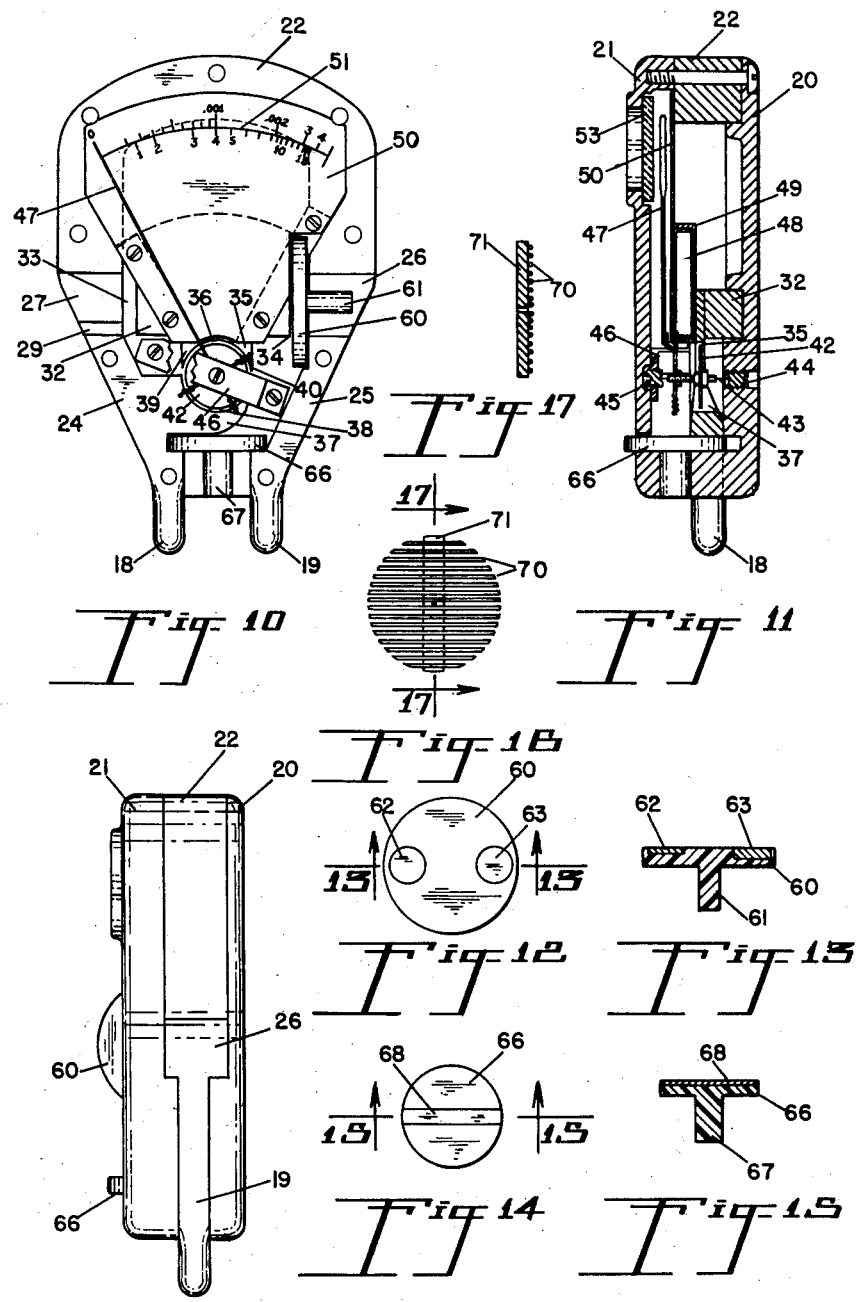
INVENTOR.
DAN L. SMITH
BY Buckhorn and Cheatham
ATTORNEY

United States Patent Office 2,827,609
Patented Mar. 18, 1958

2,827,609
MAGNETIC BRIDGE GAUGE

Dan L. Smith, Portland, Oreg.

Application April 28, 1953, Serial No. 351,569

20 Claims. (Cl. 324—34)

The present invention relates to a magnetic testing instrument and more particularly it relates to an instrument capable of measuring with precision variations in the thickness of nonmagnetic material or coating upon a magnetic base, or variations in the magnetic properties of a magnetic material.

Magnetic testing instruments provided heretofore have generally incorporated an electrical circuit requiring either the provision of a power source within the instrument or means for connecting the instrument to a remote source. The former arrangement increases the bulk of the instrument while the latter arrangement limits the mobility of the instrument. Certain prior art devices, while compact and of light weight, have only a limited range of utility and in most cases are not particularly sensitive within that range.

It is a general object of the present invention, therefore, to provide a new and improved light weight instrument for making magnetic measurements.

More particularly, it is an object of the present invention to provide a compact instrument for measuring magnetic properties that is wholly self-contained and independent of external sources of energy.

Another object of the invention is to provide a magnetic instrument utilizing a new and improved magnetic circuit.

Still another object of the invention is to provide a magnetic measuring instrument of the magnetic circuit type having relatively great sensitivity.

A further object of the invention is to provide a magnetic measuring device of the magnetic circuit type having adjustable ranges of sensitivity.

An important object of the invention is to provide a magnetic measuring instrument utilizing a flux sensitive indicating device.

Other objects and advantages of the invention will become more apparent hereinafter.

In accordance with the illustrated embodiment, the invention comprises a permanent magnet and a plurality of elements of magnetic material arranged with the magnet and with each other in such a manner as to provide a magnetic Wheatstone bridge circuit for the flux between the poles of the magnet, the elements being spaced apart to provide the necessary reluctance values in the various arms of the circuit. A pair of the elements define a pair of test probes between which or against which the material to be tested may be placed. The magnetic properties of the tested material are detected by measuring the resulting unbalance in the magnetic circuit, a new and improved flux sensitive indicating device being provided for that purpose.

For a more complete description of the invention, reference is made to the following specification taken in conjunction with the accompanying drawings, wherein:

Fig. 1 is a schematic diagram of an electrical Wheatstone bridge circuit;

Fig. 2 is a somewhat schematic diagram of the instrument of the invention and illustrating the analogy of the magnetic circuit therein to the electrical Wheatstone bridge circuit of Fig. 1;

Fig. 3 is a schematic view illustrating the operation of the flux measuring device incorporated in the instrument of the invention;

Fig. 4 is a further view illustrating another phase in the operation of the flux measuring device;

Fig. 5 is another view illustrating the operation of the flux measuring device;

Fig. 6 is still another view for the purpose of illustrating the operation of the flux measuring device;

Fig. 7 is a front elevation of an instrument made in accordance with the invention;

Fig. 8 is a side elevation of the instrument as viewed from the right of Fig. 7;

Fig. 9 is a side elevation of the opposite side of the instrument as viewed from the left of Fig. 7;

Fig. 10 is a front elevation of the instrument with the front case thereof removed;

Fig. 11 is a cross-sectional view taken along line 11—11 of Fig. 7;

Fig. 12 is a top plan view of a scale change shunt;

Fig. 13 is a cross-sectional view taken along line 13—13 of Fig. 12;

Fig. 14 is a top plan view of a zeroing shunt;

Fig. 15 is a cross-sectional view taken substantially along line 15—15 of Fig. 14;

Fig. 16 is an enlarged, plan view of a modified form of the indicating disc; and Fig. 17 is a cross-sectional view taken substantially along line 17—17 of Fig. 16.

Shown in Fig. 1 is the circuitry for a well known electrical Wheatstone bridge including a source of potential B connected by suitable conductors to the points A and C between which the current may pass through the bridge arms defined by known resistances $Z_1$, $Z_2$, $Z_3$ and the unknown resistance $Z_x$. As is well known, if the resistances of the arms are balanced, that is in the ratio of $$\frac{Z_1}{Z_2} = \frac{Z_2}{Z_x}$$

there will be no current flow between the points D and E. However, if the resistances of the bridge arms are not balanced in the ratio given above, there will be a current flow between the points D and E which may be measured by a suitable instrument indicated at M. The instrument M may be calibrated so that it will give readings of the resistance values for the unknown resistance $Z_x$ included in the circuit.

In Fig. 2 is shown schematically a diagram representing the essential features of the instrument of the invention and which, it will be noted, comprises a magnetic analogue of the electrical Wheatstone bridge shown in Fig. 1. In this instance, the permanent magnet $B_m$ serves as the equivalent of a source of potential between the poles of which a plurality of elements $A_m$, $C_m$, $D_m$, and $E_m$, of magnetic material are arranged with suitable gaps therebetween to form a bridge circuit for the flux extending between the poles of the magnet. The air gaps provided between the elements comprise the reluctances $R_1$, $R_2$, $R_3$, and $R_x$ forming the arms of the bridge. It will be seen that flux may pass from the left pole of the magnet $B_m$ through the element $A_m$ across the gap $R_1$, through the element $D_m$, across the gap $R_2$, to the element $C_m$ and thence to the right pole of the magnet $B_m$. Alternatively, the flux may pass from the left pole of the magnet through the element $A_m$ across the gap $R_3$ through the element $E_m$, through a layer of nonmagnetic material L which is coated upon a body of magnetic material T, through the body T and back through the layer L to the element $C_m$ and thence to the right pole of the magnet.

Alternatively, flux may travel from the left pole of the magnet by the path $A_m$, $R_1$, $D_m$, $M_m$ (a magnetic flux indicating device described in greater detail hereinafter), $E_m$, L, T, L, $C_m$ to the right pole of the magnet $B_m$; or by the path $A_m$, $R_3$, $E_m$, $M_m$, $D_m$, $R_2$, $C_m$.

Assuming that the reluctance of the body T is negligible, it will be seen that with gaps $R_1$, $R_2$, and $R_3$ constant, the amount of flux flowing through instrument $M_m$, and also its direction of flow, will depend upon the ratio of:

$$\frac{R_1}{R_2} = \frac{R_3}{R_x}$$

where $R_x$ equals the total magnetic reluctance afforded by the layer L. If $R_1$, $R_2$, and $R_3$ are constant, the unbalance of the flux flowing through instrument $M_m$ will be proportionate to $R_x$ which is an unknown factor. If $M_m$ is sensitive to the changes in flux flowing therethrough, the reluctance value of $R_x$ may be measured in any convenient units such as thickness of nonmagnetic material in thousandths of an inch, roughness of machine surface in equivalent average air gap, or units of magnetic reluctance in oersteds.

In accordance with the present invention the elements $D_m$, $E_m$, and $M_m$ comprise a magnetic flux measuring device and define means for measuring the balance of the magnetic bridge circuit, the functioning of which device will now be described with particular reference to the somewhat schematic views of Figs. 3, 4, 5, and 6. As shown, the adjacent portions of the elements $D_m$, $E_m$ are provided with complementary semicircular recesses within which the element $M_m$ is coaxially mounted, the element $M_m$ comprising a light weight, circular disc of hard steel or like material having a good retentivity. The disc $M_m$ is very lightly magnetized and is preferably of such diameter as to fit with a relatively small air gap between the elements $D_m$ and $E_m$.

If undisturbed by any external influence, the disc $M_m$ will align itself as indicated in Fig. 3 with the magnetic poles of the disc adjacent the gaps between the elements $D_m$ and $E_m$, and the flux from the disc coursing through the elements $D_m$, $E_m$ substantially as indicated by the dotted lines $F_m$. The addition of a unit of flux from an external force such as represented by the permanent magnet P in Fig. 4 will cause the disc $M_m$ to rotate to a new balance point as indicated in Fig. 4.

If the direction of the external magnetic force is reversed, as by reversing the direction of the permanent magnet P to the position shown in Fig. 5, the position of a disc $M_m$ will also reverse as indicated in Fig. 5. If additional units of flux are introduced to the magnetic circuit through the disc $M_m$, as by adding the force of a magnet Q to that of the magnet P as shown in Fig. 6, the displacement of the disc $M_m$ will increase relative to the position shown in Fig. 5.

The foregoing arrangement provides a very accurate measuring device for magnetic flux since it is extremely sensitive to changes in the flux pattern through the disc $M_m$. To this end the disc $M_m$ is only weakly magnetized as compared with the permanent magnet $B_m$. Moreover, as indicated above, the disc $M_m$ is rotatable throughout an angle of very nearly 180 degrees, whereby movements of the disc may be indicated over a relatively long scale.

An instrument incorporating the features described above is shown in Figs. 7 to 15, inclusive, and includes a casing formed of plastic or light weight nonmagnetic material and having a rear portion or base 20 and a front portion 21. Mounted on the base 20 is a U-shaped magnet 22 (Fig. 10) which is preferably a permanent magnet, but which may be an electromagnet. Extending from the opposite ends of the magnet 22 are a pair of generally parallel, coextensive pole pieces 24, 25, the lower ends of which converge slightly to define a pair of spaced apart test probes 18, 19, respectively. The pole piece 25, that is, the right pole piece as viewed in Fig. 10 and the equivalent of the element $C_m$ of Fig. 2, is fitted snugly against the adjacent end of the magnet 22 and may be soldered or brazed thereto to assure a snug fit and a minimum of flux loss therebetween. The portion 26 of the pole piece 25 immediately adjacent the magnet 22 is of substantially the same thickness and width as the magnet since it will carry substantially the full flux of the magnet. The remaining portion of the pole piece through which the flux density is much less is of reduced thickness and width to reduce the weight of the instrument. The portion 27 of the pole piece 24 which lies immediately adjacent the opposite end of the magnet 22 is likewise of substantial thickness and width. The portion 27 corresponds to the element $A_m$ of Fig. 2. The remainder or end portion 28 of the pole piece 24 which corresponds to the element $E_m$ is of lesser width and thickness than the portion 27 so as to reduce the weight of the instrument and is spaced from the portion 27 to define an air gap therebetween corresponding to the air gap $R_3$ of Fig. 2. To close this gap and prevent entrance of foreign matter into the interior of the instrument, a small insert of nonmagnetic material is placed therein, which may be an integral portion 29 of the base 20 as most clearly seen in the view of Fig. 9.

Extending between the pole piece portions 26, 27 is a main shunt member 32 formed of magnetic material of low retentivity such as soft iron, and which member corresponds to the element $D_m$ of the schematic view of Fig. 2. Since approximately half of the flux of the magnet 22 will flow through this shunt it is preferably relatively massive in cross-sectional area so that it will not be saturated during usage of the instrument. The main shunt member 32 is proportioned and mounted so that the opposite ends thereof are spaced a predetermined distance from the pole pieces 24, 25 to provide air gaps 33, 34 between the ends of the shunt member 32 and the respective adjacent pole pieces. Mounted medially of the shunt member and extending toward the free ends of the pole pieces 24, 25 is an upper pole shoe 35 which is formed with a laterally extending, substantially semi-circular recess 36 in the end thereof. The upper pole shoe 35 may be relatively thin as is apparent in Fig. 11 since very little flux will be carried thereby; and is preferably of slight thickness for the further purpose of concentrating the flux that is carried thereby.

The end portion 28 of the pole piece 24 is formed with an integral lower pole shoe portion 37 which extends inwardly of the instrument, and is formed with a substantially semicircular recess 38 coaxial with and complementary to the recess 36 formed in the upper pole shoe 35. The pole shoe portion 37 decreases in thickness adjacent the edge of the recess 38 therein, as may be seen in Fig. 11, to concentrate the flux traversing the lower pole shoe 37.

Preferably the pole shoe 35 is of substantially the same width as the diameter of the recess 36 whereby the end portions 39, 40 of the pole shoe 35 which are closely adjacent the pole shoe 37 are of relatively slight cross-sectional area whereby little flux will be lost by leakage directly between the pole shoes.

Mounted coaxially within the circular opening defined by the recesses 31, 36 is a magnetized circular disc 42 which is preferably of very light weight and also preferably of just slightly lesser diameter than the diameter of the recesses so as to provide a very slight air gap between the pole pieces and the periphery of the disc. The disc 42 corresponds to the element $M_m$ of Figs. 2 to 6, inclusive. The disc 42 is mounted upon a shaft 43 which is journaled in suitable jeweled bearings, such as the bearing 44 mounted in the case base 20 and the front bearing 45 supported in a bearing bridge 46 which is secured at its opposite ends by suitable means to the base 20. Fixedly secured to the shaft 43 is a pointer 47 for indicating the movements of the disc 42 about its axis. Attached to the pointer 47 is a conventional dampening vane 48 which is mounted to swing within a vane box 49 to dampen movements of the pointer 47. The front cover member 50 of the vane box 49 is extended upwardly as is most clearly apparent in Fig. 11 and is inscribed on its front surface with suitable indicia to provide a scale 51 for the pointer 47. Two scales of different expansion are shown, the reason for which will be made apparent. The case front portion 21 is provided with a suitable opening within which a glass plate 53 is mounted for observing the scale 51.

It will be appreciated that the structure of the instrument as described above is substantially similar to the schematic diagram of the instrument shown in Fig. 2. Thus as the reluctance of the air gap between the test probe ends 18, 19 of the pole pieces 24, 25 is changed, the flux pattern affecting the disc 42 will change, causing the disc 42 to change position and, consequently, the pointer 47. It is apparent then that the magnetic permeance of an article placed against the test probes 18, 19 will determine the deflection of the pointer 47. By calibrating the instrument in terms of thickness of a layer of material or roughness of a surface, such values may be directly measured by the instrument rapidly and accurately.

It will be noted that, as indicated by the indicia on the scale 51, the degree of deflection is substantially a logarithmic ratio whereby for any given internal reluctance values, the sensitivity of the instrument decreases as the reluctance of the path between the test probes 18, 19 increases. However, if one of the air gaps, such as the air gap 34 which corresponds to the gap $R_2$ in Fig. 2, is bridged by a shunt which lessens the reluctance of the gap then the sensitivity of the instrument will change since the ratio of change of the flux through the disc M, for any given change in the reluctance of the gap between the test probes 18, 19, will be changed accordingly.

In accordance with the invention, therefore, means are provided whereby reluctance of the air gap 34 may be varied so that the sensitivity of the instrument may be varied and its useful range thereby increased. Mounted in the air gap 34 is a scale change shunt (Figs. 12 and 13) comprising a shaft 61 and a coaxial circular disc 60 mounted so that a portion thereof extends within the gap 34. The shaft 61 of the shunt is journaled in the cooperative semicircular grooves formed in the adjacent surface of the pole piece portion 26 and the front case cover 21 as most clearly apparent in Fig. 10. The disc 60 is preferably formed of a nonmagnetic material and has mounted therein a thin insert 62 of a magnetic material of low retentivity such as soft iron and a thick insert 63 of similar material. The sensitivity of the instrument will vary depending upon which insert is in operative position in the gap 34. This occurs, of course, since the amount of flux which will be diverted through the disc 42 will depend in part upon the reluctance of the path across the gap 34. With the thin insert 62 in place in the gap 34, the reluctance will be higher than it would be if the insert 63 were in place. Consequently the sensitivity of the instrument will be greater when the thick insert 63 is placed in operative flux carrying position since a greater amount of flux will pass through the disc 42 for a smaller value of external reluctance $R_x$. As may be seen in Figs. 7 and 10, two sets of indicia of different degrees of expansion are provided upon the scale 51 to be used in conjunction with the corresponding insert 62 or 63 in operative position in the gap 34.

Means are also provided to facilitate zeroing of the pointer 47. Mounted between the test probes 18, 19 is a zeroing shunt (Figs. 14 and 15) comprising a circular disc 66 mounted upon a coaxial shaft 67. The shaft 67 is journaled within a suitable opening provided by cooperative recesses formed between the adjacent surfaces of the base portion 20, and front portion 21, of the case.

Mounted in the disc 66 and extending diametrically thereacross is an elongate strip 68 of a magnetic material preferably of low retentivity. It will be seen that by rotating the disc 66 about its axis, the relative position of the strip 68 to the test probes 18, 19 may be varied so as to vary the leakage path between the test probes, and, consequently, the flux pattern through the measuring disc 42 so that its position may be changed to zero the pointer 47.

It will be appreciated that when the instrument is not actually in use the reluctance of the gap between the test probes 18, 19 will be infinite for all practical purposes and the pointer 47 will be deflected to infinity. To zero the instrument for a series of measurements, the test probes 18, 19 are placed against a standard and the zeroing shunt adjusted to bring the needle to the zero position of the scale. The instrument may then be used to measure the relative reluctance of the material to be tested. It is apparent that the standard should have a minimum reluctance value as compared to the test materials to be compared therewith. For example, to measure the thickness of nonmagnetic coatings upon a magnetic object, the instrument is zeroed with the test probes 18, 19 in direct contact with the uncoated object, whereafter it can be used to measure the thickness of the coating of nonmagnetic material applied thereto or to similar objects.

In Figs. 16 and 17 is shown a modified construction of the indicating disc which in this instance comprises a plurality of very fine wires or rods 70 formed of a magnetic material and cemented in spaced, parallel relation upon a transversely extending support member 71 formed of a lightweight nonmagnetic material such as aluminum. The rods 70 are each lightly magnetized and are arranged so that their like poles extend in the same direction, the ends of the rods being trimmed so that they define a circle. The advantage of this structure is that a disc of lighter weight may be formed than can be conveniently formed of solid material whereby the weight of the disc will be less and the instrument embodying the same will have greater sensitivity. In addition, the gaps between the individual rods will increase the reluctance path through the disc in a direction at right angles to the longitudinal direction of the rods whereby the disc will be urged with greater force into alignment with the flux path between the pole shoes.

While a preferred construction of the instrument is shown in Figs. 7 to 15, it will be obvious that certain changes may be made without departing from the spirit of the invention. For example, the main shunt 32 may not necessarily be mounted between the pole pieces 24, 25 but may be mounted directly between the arms of the magnet 22. It is preferred, however, that the shunt be mounted between pole pieces 24, 25 of magnetic material of low retentivity, as shown, since such material will have little inherent magnetomotive force and hence the flux pattern through the shunt 32 may more readily change rendering the instrument more sensitive.

Likewise, it is not absolutely essential that the member 42 be a circular disc though the circular disc as shown is to be preferred. If a rectangular bar magnet were mounted between the pole shoes 30, 35 the magnet would deflect but the range of deflection would be limited to the width of the magnet since the end of the magnet must span the gap between the pole shoes.

It should be apparent to those skilled in the art that the invention permits of other modifications in arrangement and detail. I claim as my invention all such modifications as come within the true spirit and scope of the appended claims.

I claim:

1. In an instrument of the character described, a single source of magnetic flux, a plurality of elements of magnetic material of low retentivity defining a Wheatstone bridge-type magnetic circuit for the flux between the poles of said source, said elements being spaced apart predetermined intervals to provide air gaps of predetermined reluctance in the arms of said magnetic circuit, and permanent magnet means for measuring the unbalance of the flux in said circuit.

2. A magnetic instrument comprising a single source of magnetic flux, a plurality of elements of magnetic material of low retentivity defining a magnetic Wheatstone bridge circuit for the flux between the poles of said source, said elements being spaced apart predetermined intervals to provide air gaps of predetermined reluctance in the arms of said magnetic circuit, said elements including a pair of test probe elements spaced apart and arranged in said circuit whereby the gap between the elements constitutes a reluctance arm of the circuit, and means for measuring the flux unbalance of said circuit effected by the placement of an article to be tested within the field path between said test probe elements.

3. In a magnetic instrument of the character described, a magnet, a plurality of fixedly positioned elements of magnetic material operatively arranged with the pole ends of said magnet and spaced at predetermined intervals with respect to one another to provide a magnetic circuit for the flux between the poles of said magnet analogous to an electrical Wheatstone bridge circuit, the air gaps between said elements comprising the reluctance elements of the arms of said magnetic circuit, and means for measuring the unbalance of the flux in said magnetic circuit.

4. A magnetic testing instrument comprising a single source of magnetic flux, a plurality of elements of magnetic material of low retentivity defining a magnetic Wheatstone bridge circuit between the poles of said source, said elements being spaced apart to provide air gaps of predetermined reluctance in the arms of said circuit, flux measuring means for measuring the unbalance of flux in said circuit, and means for varying the reluctance of one of the arms of said circuit.

5. A magnetic testing instrument comprising a single source of magnetic flux, a plurality of elements of magnetic material of low retentivity defining a magnetic Wheatstone bridge circuit between the poles of said source, said elements being spaced apart to provide air gaps of predetermined reluctance in the arms of said circuit, flux measuring means operatively arranged with said circuit for measuring the flux balance thereof, and means for varying the flux carrying capacity of one of the arms of said magnetic circuit.

6. In an instrument of the character described, a magnet, a plurality of elements of magnetic material of low retentivity defining a magnetic Wheatstone bridge circuit for the flux between the poles of said magnet, said elements being spaced apart predetermined intervals to provide air gaps of predetermined reluctance in the arms of said magnetic circuit, means for measuring the unbalance of flux through said magnetic circuit, and shunt means for varying the reluctance of at least one of said air gaps.

7. In an instrument of the character described, a magnet, a plurality of elements of magnetic material and low retentivity defining a magnetic Wheatstone bridge circuit for the flux between the poles of said magnet, said elements being spaced apart predetermined intervals to provide air gaps of predetermined reluctance in the arms of said magnetic circuit, means for measuring the unbalance of flux through said magnetic circuit, and shunt means for varying the reluctance of at least two of said air gaps.

8. In a magnetic testing instrument, a magnet, a plurality of elements of magnetic material and of low retentivity operatively arranged with the poles of said magnet to define a Wheatstone bridge magnetic circuit between said poles, said elements being spaced apart predetermined distances to provide gaps of predetermined reluctance in the arms of said magnetic circuit, a magnetic flux measuring means operatively arranged with said elements for measuring the unbalance of flux through said circuit, and means for changing the sensitivity of said instrument comprising a piece of magnetic material adapted to be inserted in the air gap between a selected pair of said elements, and means supporting said piece of magnetic material upon said instrument for selective movement into and out of the gap between said pair of elements.

9. In a magnetic testing instrument, a magnet, a plurality of elements of magnetic material including a pair of test probe elements operatively arranged with the poles of said magnet to define a magnetic Wheatstone bridge circuit between said poles, at least one pair of said elements being spaced apart a predetermined interval to provide an air gap of predetermined reluctance defining an arm of said magnetic circuit, a magnetic flux measuring means operatively arranged with said elements for measuring the balance of flux through said circuit, and means for changing the sensitivity of said instrument comprising a shunt member having portions of different magnetic permeability, and means mounting said shunt member upon said instrument for selective movement of said member portions into and out of the gap between said pair of elements.

10. A magnetic flux measuring device comprising a pair of pole shoes spaced apart a predetermined distance to provide a slight air gap therebetween, said shoes being formed of a magnetic material of low magnetic retentivity, said shoes having complementary semicircular lateral recesses formed in the adjacent surfaces thereof, a thin, magnetized circular disc of slightly smaller diameter than the diameter of said recesses, and means rotatably supporting said disc between said shoes coaxially of said recesses whereby variations in the distribution of magnetic flux passing through said pole shoes will cause said disc to change in relative position about the axis thereof.

11. In a magnetic flux measuring device, a pair of pole shoes spaced apart a predetermined distance to provide a slight air gap therebetween, said shoes having coaxial, substantially semicircular lateral recesses formed in the adjacent surfaces thereof, said shoes being formed of a magnetic material of low magnetic retentivity, a magnetized circular disc, and means rotatably supporting said disc between said shoes coaxially of said recesses whereby variations in the distribution of a magnetic flux passing through said pole pieces will cause said disc to change in relative position about the axis thereof.

12. A magnetic flux measuring device comprising a pair of substantially coplanar pole shoe members formed of magnetic material and spaced apart a predetermined distance to provide a slight air gap therebetween, said pole shoe members having coaxial, substantially semicircular cut away portions on the adjacent surfaces thereof to define a circular opening, and a permanently magnetized member of magnetic material pivotally mounted coaxially of said opening between said pole shoe members, whereby the rotational position of said magnetized member will change in response to changes in the magnetic flux pattern in said pole pieces.

13. A magnetic flux measuring device comprising a pair of substantially coplanar pole shoes members formed of magnetic material and spaced apart a predetermined distance to provide a slight air gap therebetween, said members having coaxial semicircular recesses formed in the adjacent portions thereof, a permanently magnetized circular disc rotatably mounted coaxially within the opening defined by said recesses, at least one of said pole pieces being of a width substantially equal to the diameter of said recesses whereby the portions of said one pole piece immediately adjacent said other pole piece will be of relatively slight cross-sectional area.

14. In a magnetic testing instrument comprising a magnet, a plurality of elements of magnetic material including a pair of test probe elements operatively arranged with the poles of said magnets to define the magnetic Wheatstone bridge circuit between said poles, and means for measuring the unbalance of said magnetic circuit as the reluctance of the flux path between said probe elements changes, the combination therewith of a zeroing shunt comprising an elongate strip of magnetic material and means mounted on said instrument movably supporting said strip between said probe elements whereby the relative proximity of said strip to said probe elements may be varied to vary the condition of balance of said magnetic circuit.

15. In a magnetic testing instrument of the class decribed, the combination comprising a magnet, a plurality of elements of magnetic material operatively arranged with the poles of said magnet to define the magnetic Wheatstone bridge between said poles, said elements including a pair of test probe elements, means for measuring the unbalance of the flux in said circuit, and shunt means between said test probes for establishing and varying a flux leakage path between said test probes whereby the initial condition of balance of said circuit may be varied.

16. A magnetic measuring device comprising a substantially U-shaped magnet, a pair of generally parallel, coextensive pole pieces, formed of magnetic material of relatively low retentivity, extending from the ends of said magnet, one of said pole pieces comprising an end portion spaced from the remainder thereof a predetermined distance to define an air gap in said pole piece, a shunt member of magnetic material extending generally between the portion of said one pole piece adjacent said magnet and said other pole piece but spaced from each of said pole pieces to provide an air gap at each of the opposite ends of said shunt member, said shunt member including a first pole shoe formed with a laterally extending, substantially semicircular recess facing the free ends of said pole pieces and disposed substantially medially of said shunt member, said end portion including a second pole shoe formed with a laterally extending substantially semicircular recess complementary to said first mentioned recess, said shoes being spaced apart a predetermined distance at the opposite sides of said recess, a magnetized circular disc rotatably mounted coaxially in the recesses between said shoes, whereby changes in the magnetic permeability in the gap between the free ends of said pole pieces will effect a change in the relative rotative position of said disc, and indicator means fixedly secured to said disc for indicating changes in the position thereof.

17. A magnetic measuring device comprising a permanent magnet, a pair of generally parallel, coextensive magnet pole pieces formed of magnetic material of low retentivity extending from the ends of said magnet, the free ends of said pole pieces defining a pair of test probe elements, one of said pole pieces having a high reluctance path in an intermediate portion thereof, a shunt member of magnetic material extending generally between the portion of said one pole piece immediately adjacent said magnet and said other pole piece but spaced from each of said pole pieces to provide an air gap at each of the opposite ends of said shunt member, said shunt member including a first pole shoe formed with a substantially semicircular recess facing the free ends of said pole pieces and disposed medially of said shunt member, the end portion of said first pole piece including a second pole shoe spaced from said first pole shoe and formed with a substantially semicircular recess facing said recess of said first pole shoe and coaxial therewith, and a magnetized circular disc rotatably mounted coaxially in the recesses between said shoes, whereby changes in the magnetic permeability in the gap between the free ends of said pole pieces will effect a change in the relative rotative position of said disc.

18. A magnetic armature for a flux measuring device comprising a plurality of magnetized wires or rods secured in spaced apart, axially parallel relation, the axes of said rods lying in the same plane, the ends of said rods defining a circle, each of said rods being magnetized, said rods being arranged with their like poles extending in the same direction.

19. In an instrument of the character described, a permanent magnet, a plurality of elements of magnetic material of low retentivity defining a Wheatstone bridge type magnetic circuit for the flux between the poles of said magnet, said elements being spaced apart predetermined intervals to provide air gaps of predetermined reluctance in the arms of said magnetic circuit, and permanent magnet means for measuring the unbalance of the flux in said circuit.

20. A magnetic instrument comprising a single source of magnetic flux, a plurality of elements of magnetic material of low retentivity defining a magnetic Wheatstone bridge circuit for the flux between the poles of said source, said elements being spaced apart to define air gaps of predetermined reluctance in the arms of said circuit including a pair of test probe elements, and permanent magnet means for measuring the flux unbalance of said circuit.

References Cited in the file of this patent

UNITED STATES PATENTS

| | | |
|---|---|---|
| 1,925,904 | Mayne | Sept. 5, 1933 |
| 1,966,984 | Lichtenberger et al. | July 17, 1934 |
| 2,312,140 | Welch | Feb. 23, 1943 |
| 2,469,476 | Sellars | May 10, 1949 |
| 2,537,731 | Angell | Jan. 9, 1951 |
| 2,549,371 | Fereday | Apr. 17, 1951 |
| 2,626,983 | Lavery | Jan. 27, 1953 |